United States Patent
Wang et al.

(10) Patent No.: US 11,146,802 B2
(45) Date of Patent: Oct. 12, 2021

(54) METHODS AND APPARATUS FOR PROVIDING TWO-DIMENSIONAL SPATIAL RELATIONSHIPS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/380,840

(22) Filed: Apr. 10, 2019

(65) Prior Publication Data
US 2019/0320190 A1  Oct. 17, 2019

Related U.S. Application Data

(60) Provisional application No. 62/656,568, filed on Apr. 12, 2018.

(51) Int. Cl.
*H04N 13/161* (2018.01)
*H04N 13/178* (2018.01)
(Continued)

(52) U.S. Cl.
CPC ......... *H04N 19/23* (2014.11); *H04N 5/23238* (2013.01); *H04N 13/161* (2018.05)

(58) Field of Classification Search
CPC .. H04N 21/816; H04N 21/8543; H04N 19/23; H04N 13/161; H04N 5/23238
(Continued)

(56) References Cited

U.S. PATENT DOCUMENTS

2010/0153395 A1* 6/2010 Hannuksela ..... H04N 21/85406
707/737
2011/0064146 A1* 3/2011 Chen ..................... H04N 19/61
375/240.26
(Continued)

OTHER PUBLICATIONS

[No Author Listed], Information technology—Coded representation of immersive media—Part 2: Omnidirectional media format. ISO/IEC FDIS 23090-2:2018(E). 2018:168 pages.
(Continued)

*Primary Examiner* — Albert Kir
(74) *Attorney, Agent, or Firm* — Wolf, Greenfield & Sacks, P.C.

(57) ABSTRACT

The techniques described herein relate to methods, apparatus, and computer readable media configured to specify two-dimensional spatial relationship information. Video data includes a track group type for a group of two-dimensional tracks. The track group type is a two-dimensional spatial relationship track group type, wherein a spatial relationship of the group of tracks is specified based on a two-dimensional Cartesian coordinate system. Two-dimensional spatial relationship description data for the group of tracks, can specify a two-dimensional region based on the two-dimensional Cartesian coordinate system, and a relation of each two-dimensional track in the group of two-dimensional tracks to the two-dimensional region. Source data for the two-dimensional region can be generated by composing each two-dimensional track from the group of tracks based on the associated relation of the two-dimensional track to the two-dimensional region.

19 Claims, 6 Drawing Sheets

(51) Int. Cl.
*H04N 19/23* (2014.01)
*H04N 5/232* (2006.01)
*H04N 19/70* (2014.01)

(58) Field of Classification Search
USPC .................................................... 375/240.08
See application file for complete search history.

(56) References Cited

U.S. PATENT DOCUMENTS

| | | | | |
|---|---|---|---|---|
| 2018/0103199 | A1* | 4/2018 | Hendry | H04N 21/8543 |
| 2019/0313081 | A1* | 10/2019 | Oh | H04N 13/117 |
| 2019/0320190 | A1* | 10/2019 | Wang | H04N 5/23238 |
| 2019/0373245 | A1* | 12/2019 | Lee | H04N 21/816 |
| 2020/0389640 | A1* | 12/2020 | Lee | H04N 13/117 |

OTHER PUBLICATIONS

[No Author Listed], Information technology—Coding of audio-visual objects—Part 12: ISO base media file format, Amendment 1. ISO/IEC JTC1/SC29/WG11/N17378. 2014:20 pages.

[No Author Listed], Information technology—MPEG systems technologies—Part 10: Carriage of timed metadata metrics of media in ISO base media file format / Amd 1 Carriage of spatial information. ISO/IEC 23001-10:2015/FDAM 1:2016(E), ISO/IEC JTC1/SC29/WG11/N16191. Jun. 2, 2016:8 pages.

Hannuksela et al., Technology under Consideration on sub-picture composition track grouping for OMAF. International Organisation for Standardisation, Coding of Moving Pictures and Audio, ISO/IEC JTC1/SC29/WG11 MPEG2017/N17279. Oct. 2017:6 pages.

\* cited by examiner

```
aligned(8) class SpatialRelationshipDescriptionBox extends
TrackGroupTypeBox('srd')
{
    // track_group_id is inherited from TrackGroupTypeBox;
    unsigned int(32) total_width;     ← 302
    unsigned int(32) total_height;    ← 304
    unsigned int(32) source_id;       ← 306
}
```

```
class SpatialRelationshipGroupEntry () extends
VisualSampleGroupEntry ('srd') {
    unsigned int(16) object_x;        ← 352
    unsigned int(16) object_y;        ← 354
    unsigned int(16) object_width;    ← 356
    unsigned int(16) object_height;   ← 358
}
```

```
aligned(8) class SubPictureCompositionBox extends
TrackGroupTypeBox('spco') {
    SubPictureRegionBox();
    // optional boxes
} aligned(8) class SubPictureRegionBox extends FullBox('sprg',0,0) {
    unsigned int(16) track_x;          ← 372
    unsigned int(16) track_y;          ← 374
    unsigned int(16) track_width;      ← 376
    unsigned int(16) track_height;     ← 378
    unsigned int(16) composition_width;  ← 380
    unsigned int(16) composition_height; ← 382
}
```

```
aligned(8) class 2DSpatialRelationshipDescriptionBox extends
TrackGroupTypeBox('2dcc')
{
    // track_group_id is inherited from TrackGroupTypeBox;
    unsigned int(32) total_width;     — 402
    unsigned int(32) total_height;    — 404
    unsigned int(32) source_id;       — 406
}
```

```
class 2DSpatialRelationshipGroupEntry () extends
VisualSampleGroupEntry ('2dcc') {
    unsigned int(16) object_x;        — 452
    unsigned int(16) object_y;        — 454
    unsigned int(16) object_width;    — 456
    unsigned int(16) object_height;   — 458
}
```

METHODS AND APPARATUS FOR PROVIDING TWO-DIMENSIONAL SPATIAL RELATIONSHIPS

RELATED APPLICATIONS

This Application claims priority under 35 U.S.C. § 119(e) to U.S. Provisional Application Ser. No. 62/656,568, filed Apr. 12, 2018, entitled "METHODS OF SIGNALLING SPATIAL RELATIONSHIPS OF VISUAL TRACKS IN A 2D CARTESIAN COORDINATE SYSTEM IN ISOBMFF," which is herein incorporated by reference in its entirety.

TECHNICAL FIELD

The techniques described herein relate generally to video coding, and particularly to two-dimensional (2D) spatial relationships of visual tracks provided using Cartesian coordinates.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for 2D spatial relationships of tracks that are specified using a 2D Cartesian coordinate system.

Some embodiments relate to a decoding method for decoding video data. The method includes receiving video data comprising a track group type for a group of two-dimensional tracks. The method includes determining the track group type is a two-dimensional spatial relationship track group type, wherein a spatial relationship of the group of tracks is specified based on a two-dimensional Cartesian coordinate system. The method includes determining two-dimensional spatial relationship description data for the group of tracks, comprising determining a two-dimensional region based on the two-dimensional Cartesian coordinate system, and a relation of each two-dimensional track in the group of two-dimensional tracks to the two-dimensional region. The method includes generating source data for the two-dimensional region by composing each two-dimensional track from the group of tracks based on the associated relation of the two-dimensional track to the two-dimensional region.

In some examples, determining the two-dimensional region includes determining a width and a height of the two-dimensional region.

In some examples, determining the relation of each two-dimensional track includes determining a position, a width, a height, or some combination thereof, of the two-dimensional track in the two-dimensional region.

In some examples, generating the source data comprises generating the source data based on one or more constraints from a set of constraints. The set of constraints can include one or more of a first constraint that each two-dimensional track in the track group is associated with only one alternate track group, a second constraint that any two overlapping two-dimensional tracks in the track group have a different layer value, a third constraint that each pixel in the two-dimensional region comprises content, a fourth constraint that each two-dimensional track in the track group comprises a same source identifier and a same set of dimensions for the two-dimensional region, or some combination thereof.

Some embodiments relate to a method for encoding video data. The method includes encoding video data comprising a track group type for a group of two-dimensional tracks, wherein the track group type is a two-dimensional spatial relationship track group type, wherein a spatial relationship of the group of tracks is specified based on a two-dimensional Cartesian coordinate system. Two-dimensional spatial relationship description data for the group of tracks is specified, including a two-dimensional region based on the two-dimensional Cartesian coordinate system, and a relation of each two-dimensional track in the group of two-dimensional tracks to the two-dimensional region. Source data can be generated for the two-dimensional region by composing each two-dimensional track from the group of tracks based on the associated relation of the two-dimensional track to the two-dimensional region.

In some examples, the two-dimensional region comprises a width and a height of the two-dimensional region.

In some examples, the relation of each two-dimensional track comprises a position, a width, a height, or some combination thereof, of the two-dimensional track in the two-dimensional region.

In some examples, the source data can be generated based on one or more constraints from a set of constraints. The set of constraints can include one or more of a first constraint that each two-dimensional track in the track group is associated with only one alternate track group, a second constraint that any two overlapping two-dimensional tracks in the track group have a different layer value, a third constraint that each pixel in the two-dimensional region comprises content, a fourth constraint that each two-dimensional track in the track group comprises a same source identifier and a same set of dimensions for the two-dimensional region, or some combination thereof.

Some embodiments relate to an apparatus configured to decode video data. The apparatus includes a processor in communication with memory, the processor being configured to execute instructions stored in the memory that cause the processor to receive video data comprising a track group type for a group of two-dimensional tracks. The instructions cause the processor to determine the track group type is a two-dimensional spatial relationship track group type, wherein a spatial relationship of the group of tracks is specified based on a two-dimensional Cartesian coordinate system. The instructions cause the processor to determine two-dimensional spatial relationship description data for the group of tracks, including determining a two-dimensional region based on the two-dimensional Cartesian coordinate system, and a relation of each two-dimensional track in the group of two-dimensional tracks to the two-dimensional region. The instructions cause the processor to generate source data for the two-dimensional region by composing each two-dimensional track from the group of tracks based on the associated relation of the two-dimensional track to the two-dimensional region.

In some examples, determining the two-dimensional region comprises determining a width and a height of the two-dimensional region.

In some examples, determining the relation of each two-dimensional track comprises determining a position, a width, a height, or some combination thereof, of the two-dimensional track in the two-dimensional region.

In some examples, generating the source data comprises generating the source data based on one or more constraints from a set of constraints. The set of constraints includes one or more of a first constraint that each two-dimensional track in the track group is associated with only one alternate track group, a second constraint that any two overlapping two-dimensional tracks in the track group have a different layer value, a third constraint that each pixel in the two-dimensional region comprises content, a fourth constraint that each two-dimensional track in the track group comprises a same source identifier and a same set of dimensions for the two-dimensional region; or some combination thereof.

Some embodiments relate to an apparatus for encoding video data. The apparatus includes a processor in communication with memory, the processor being configured to execute instructions stored in the memory that cause the processor to encode video data comprising a track group type for a group of two-dimensional tracks, wherein the track group type is a two-dimensional spatial relationship track group type, wherein a spatial relationship of the group of tracks is specified based on a two-dimensional Cartesian coordinate system. Two-dimensional spatial relationship description data for the group of tracks is specified, including a two-dimensional region based on the two-dimensional Cartesian coordinate system, and a relation of each two-dimensional track in the group of two-dimensional tracks to the two-dimensional region, such that source data can be generated for the two-dimensional region by composing each two-dimensional track from the group of tracks based on the associated relation of the two-dimensional track to the two-dimensional region.

In some examples, the two-dimensional region comprises a width and a height of the two-dimensional region.

In some examples, the relation of each two-dimensional track comprises a position, a width, a height, or some combination thereof, of the two-dimensional track in the two-dimensional region.

In some examples, the source data can be generated based on one or more constraints from a set of constraints. The set of constraints can include one or more of a first constraint that each two-dimensional track in the track group is associated with only one alternate track group, a second constraint that any two overlapping two-dimensional tracks in the track group have a different layer value, a third constraint that each pixel in the two-dimensional region comprises content, and a fourth constraint that each two-dimensional track in the track group comprises a same source identifier and a same set of dimensions for the two-dimensional region; or some combination thereof.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3A shows an exemplary spatial relationship description box, according to some examples.

FIG. 3B shows an exemplary spatial relationship group entry, according to some examples.

FIG. 3C shows an example of a track group type box, according to some examples.

FIG. 4A shows an exemplary 2D spatial relationship description box, according to some embodiments.

FIG. 4B shows an exemplary 2D spatial relationship group entry, according to some embodiments.

DETAILED DESCRIPTION OF INVENTION

Techniques can be used to represent spatial relationships of tracks, including for composite track formats (e.g., ISOBMFF). However, the inventors have discovered and appreciated that such techniques only allow the relationship to be specified as a 2D relationship. Further, the techniques are the only way to specify spatial relationship information for any group of tracks, regardless of whether a different relationship would be more appropriate (e.g., a three or six degrees of freedom, instead of 2D). Therefore, the current techniques preclude the use of any other type of spatial relationship other than a 2D relationship. Further, the inventors have discovered and appreciated that existing techniques do not constrain various aspects of the spatial relationships and/or related groups, which can lead to errors in processing spatial relationships.

The techniques disclosed herein provide for specifying specific 2D spatial relationship information in a manner that is limited for 2D relationship applications, as desired. By limiting the 2D spatial relationship to 2D scenarios, the techniques can allow other relationships to be added and/or supported, which was not possible using the existing techniques. Further, the techniques constrain various aspects of the 2D spatial relationship and/or groups that were not previously constrained in order to provide for better relationship descriptions and ultimate creation of the content based on the group of tracks.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
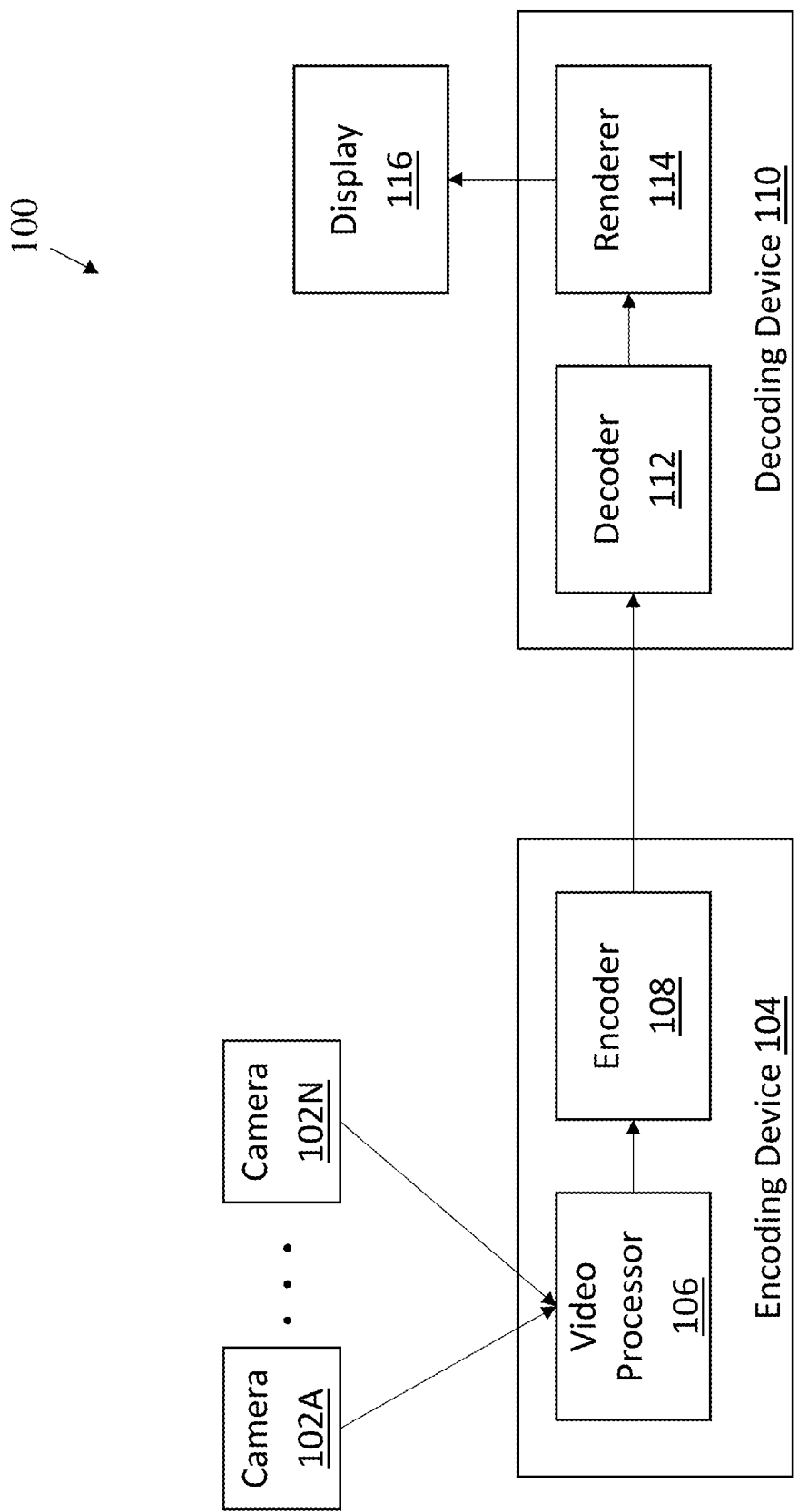
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
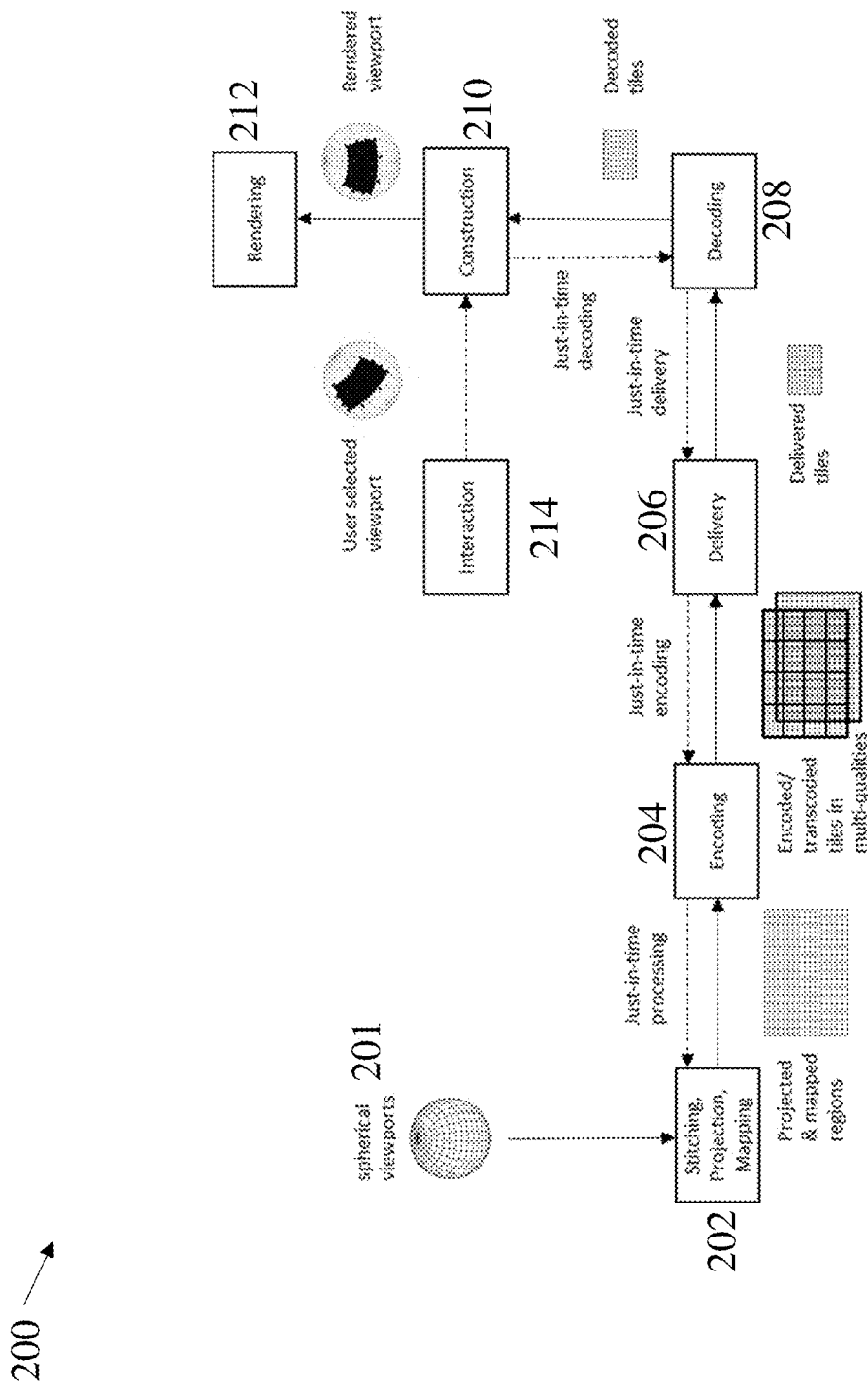
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Existing video coding techniques can provide for specifying spatial relationships for groups of tracks. Groups can be desirable, for example, to describe the relationship of each track in the group to a region. For example, for ultra-high definition content, a group can be used to specify the relationship of a plurality of tracks.

MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format. MPEG-4 Part 4 (ISO/

IEC 14496-12) PDAM1 provides an example of a spatial relationship group type and a sub-picture track properties sample group for ISOBMFF. A portion of the PDAM1 is specified in w17378, titled "Revised text of ISO/IEC 14496-12 6th edition PDAM 1 Compact Sample-to-Group, new capabilities for tracks, and other improvements," $121^{st}$ MPEG Meeting, January 2018 (Gwangju, Korea), which is hereby incorporated by reference herein in its entirety. FIG. 3A shows an exemplary spatial relationship description box 300, according to some examples. As shown in FIG. 3A, a TrackGroupTypeBox with track_group_type equal to 'srd' can be used to indicate that the track belongs to a group of tracks with spatial relationships (e.g. that the tracks correspond to spatial parts of a video source). The total_width 302 can specify, e.g., in pixel units, the maximum width in the coordinate system of the 'srd' track group. The value of total_width 302 can be constrained to be the same in instances of SpatialRelationshipDescriptionBox with the same value of track_group_id. The total_height 304 can specify, e.g., in pixel units, the maximum height in the coordinate system of the 'srd' track group. The value of total_height 304 can be constrained to be the same in instances of SpatialRelationshipDescriptionBox with the same value of track_group_id. The source_id 306 parameter can provide a unique identifier for the source. The source_id 306 can implicitly specify a coordinate system associated to this source.

A TrackGroupTypeBox of track_group_type 'srd' and a given track_group_id, which can be inherited from the TrackGroupTypeBox, can (e.g., implicitly) specify a coordinate system. The coordinate system can have an arbitrary origin (0,0) and a maximum size defined by total_width 302 and total_height 304. The x-axis can be oriented from left to right, and the y-axis can be oriented from top to bottom. The tracks that have the same value of source_id 306 within a TrackGroupTypeBox of track_group_type 'srd' can be mapped as originating from the same source, and their associated coordinate systems can share the same origin (0,0) and axes orientations. For example, a very high resolution video could have been split into sub-picture tracks. Each sub-picture track then conveys its position and sizes in the source video. The 'srd' track group may convey the size of the source.

In some examples, a source can be represented by different 'srd' track groups (for instance, when the same source is available at different resolutions). Each 'srd' track group can be identified by its own identifier track_group_id. Since both 'srd' track groups originate from the same source, they can share the same source_id.

FIG. 3B shows an example of a spatial relationship group entry 350, according to some examples. The 'srd' grouping_type for a sample grouping can be used to provide the positions and sizes of sub-picture tracks in a spatial relationship track group. The object_y 352 can specify the horizontal position of the top-left corner of the sub-picture track within the region specified by the corresponding spatial relationship track group (e.g., as discussed in conjunction with FIG. 3A) prior to resampling. In some examples, resampling (e.g., implicit resampling) can be applied based on the track width and height, if any, being in the range of 0 to total_width−1, inclusive, where total_width is included in the corresponding SpatialRelationshipDescriptionBox. The object_y 354 can specify the vertical position of the top-left corner of the sub-picture track within the region specified by the corresponding spatial relationship track group prior to resampling. In some examples, resampling (e.g., implicit resampling) can be applied based on the track width and height, if any, being in the range of 0 to total_height−1, inclusive, where total_height is included in the corresponding SpatialRelationshipDescriptionBox.

The object_width 356 can specify the width of the sub-picture track within the region specified by the corresponding spatial relationship track group prior to resampling. In some examples, resampling (e.g., implicit resampling) can be applied based on the track width and height, if any, being in the range of 1 to total_width, inclusive. The object_height 358 can specify the height of the sub-picture track within the region specified by the corresponding spatial relationship track group prior to resampling. In some examples, resampling (e.g., implicit resampling) can be applied based on the track width and height, if any, being in the range of 1 to total_height, inclusive.

The source can be reconstructed by picking one track from each alternate group, out of all tracks belonging to the same 'srd' track group. For each composition-time aligned sample of each of the selected tracks, the following can be applied (e.g., in the front-to-back ordering (layer) indicated in the TrackHeaderBox of the picked tracks): for each value of i in the range of 0 to object_width 356−1, inclusive, and for each value of j in the range of 0 to object_height 358−1, inclusive, the pixel value of the source at pixel position ((i+object_x 352) % total_width, (j+object_y 354) % total_height) is set equal to the pixel value of the sub-picture of this track at pixel position (i,j).

The Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media, and OMAF includes extensions to ISOBMFF for omnidirectional media as well as for timed metadata for sphere regions. The MPEG OMAF Technologies Under Consideration (TuC) is another example of an existing video coding technique for specifying spatial relationship groups, which can be used to specify a sub-picture composition track grouping. A portion of the OMAF TuC is specified in w17279, titled "Technology under Consideration on sub-picture composition track grouping for OMAF," $120^{th}$ MPEG Meeting, October 2017 (Macau, China), which is hereby incorporated by reference herein in its entirety.

FIG. 3C shows an example of a track group type box 370, according to some examples. A TrackGroupTypeBox with track_group_type equal to 'spco' can indicate that the track belongs to a composition of tracks that can be spatially arranged to obtain composition pictures. The visual tracks mapped to this grouping (e.g., the visual tracks that have the same value of track_group_id within TrackGroupTypeBox with track_group_type equal to 'spco') can collectively represent visual content that can be presented. In some examples, each individual visual track mapped to this grouping may or may not be intended to be presented alone without other visual tracks, while composition pictures are suitable to be presented.

The track_x 372 can specify, in luma sample units, the horizontal position of the top-left corner of the samples of this track on the composition picture. The value of track_x 372 can be in the range of 0 to composition_width 380−1, inclusive. The track_y 374 can specify, in luma sample units, the vertical position of the top-left corner of the samples of this track on the composition picture. The value of track_y 374 can be in the range of 0 to composition_height 382−1, inclusive. The track_width 376 can specify, in luma sample units, the width of the samples of this track on the composition picture. The value of track_width 376 can be in the range of 1 to composition_width 380-1, inclusive. The track_height 378 can specify, in luma sample units, the height of the samples of this track on the composition picture. The value of track_height 378 can be in the range of 1 to composition_height 382-1, inclusive.

The composition_width 380 can specify, in luma sample units, the width of the composition picture. The value of composition_width 380 can be the same in all instances of SubPictureCompositionBox with the same value of track_group_id. The composition_height 382 can specify, in luma sample units, the height of the composition picture. The value of composition_height 382 can be the same in all instances of SubPictureCompositionBox with the same value of track_group_id.

The rectangle represented by track_x 372, track_y 374, track_width 376, and track_height 378 can be referred to as the sub-picture rectangle of this track. For tracks belonging to the same sub-picture composition track group and belonging to the same alternate group (e.g., having the same non-zero alternate group value), the position and size of the sub-picture rectangles can be the same.

The composition picture of a sub-picture composition track group can be derived by picking one track from each alternate group, out of all tracks belonging to the sub-picture composition track group. For each of the picked tracks, for each value of i in the range of 0 to track_width 376-1, inclusive, and for each value of j in the range of 0 to track_height 378-1, inclusive, the luma sample of the composition picture at luma sample position ((i+track_x 372) % composition_width 380, (j+track_y 374) % composition_height 382) is set equal to the luma sample of the sub-picture of this track at luma sample position (i,j). For each of the picked tracks, when the decoded picture has a chroma format other than 4:0:0, the chroma components can be derived accordingly. As discussed in conjunction with FIGS. 3A-3B, both techniques can use a similar process to derive a source picture or a composition picture.

In some examples, the sub-picture rectangles of the tracks belonging to the same sub-picture composition track group and belonging to different alternate groups (e.g., having alternate_group equal to 0 or different alternate_group values) shall not overlap and shall not have gaps, such that in the above derivation process for the composition picture, each luma sample position (x, y), where x is in the range of 0 to composition_width−1, inclusive, and y is in the range of 0 to composition_height−1, inclusive, is traversed once.

The inventors have discovered and appreciated that existing techniques for grouping sub-picture tracks, such as those discussed in FIGS. 3A-3C, are provided in a way that they cover any type of special relationship that can be specified for a group of tracks. Because of such a structure, existing techniques encompass all spatial relationships, yet existing techniques can only specify a spatial relationship with respect to a 2D Cartesian coordinate system. Additionally, such current spatial relationship group type and sub-picture track properties sample groups can only be specified for 2D visual tracks. Further, various constraints are left undefined, which can result in encoding and/or decoding issues. For example, while the sub-picture composition track group in FIG. 3C may be configured to not allow an overlap or gap among the tracks of a group with respect to the source or composition picture, the sub-picture track properties sample group discussed in conjunction with FIGS. 3A-3B has no such constraint.

The inventors have further discovered and appreciated that given a sub-picture track properties sample group (e.g., as discussed in conjunction with FIGS. 3A-3B) and a sub-picture composition track group in (e.g., as discussed in conjunction with FIG. 3C), the reconstruction of their respective source and composition picture is not well defined and is therefore susceptible to errors. For example, there are issues with potential alternate groups within the group, when one track in the group belongs to (i) an alternate group but not all the tracks in that alternate group belong to this sub-picture group, and (ii) more than one alternate groups which can result in picking a same track more than once.

The inventors have also discovered and appreciated that there are a number of unspecified parameters and/or constraints for existing grouping techniques. An example of an unspecified constraint is the layer used for front-to-back ordering of the picked tracks, such that two overlapping tracks may have a same layer value and therefore do not specify which should be layered first. Without specifying their layers, overlapping tracks may result in different, undefined rendering results for the ultimate pictures, such as uncertainties of which track replaces the other, which track is layered in front and which one is layered in the back, and/or what overlay effects should be used when one track is put on top of the other. Another example of an unspecified constraint is to provide full coverage of the content of the rectangular source (e.g., specified with total_height and total_width) by content of the tracks in the group. For example, there can be situations where there is a portion of the source that does not include any background color, image or video. If the rectangular source is not fully covered by the content of the tracks in the group, a lack of specified content that needs to be presented in the uncovered area may result in un-desirable or un-pleasant viewing experiences. A further example of an unspecified constraint is there are no constraints on the source ID, total height and/or total width values of the source. For example, the tracks in a group can include different values for one or more of the source_id, total_height and/or total_width values, e.g., even if they are from a same source of same size. For example, tracks with different values for one or more of such attributes can cause inconsistencies in the placement and/or rendering of the content in those tracks. As another example, the source_id, total_height and total_width can't currently be specified just once for all of the group tracks.

The techniques described herein provide for signaling spatial relationships of visual tracks in a 2D Cartesian Coordinate System that resolves these and other issues with existing techniques. In some embodiments, the techniques described herein can be used to redesign the sub-picture track properties sample group to a 2D-specific group that is specified using a Cartesian coordinate system (e.g., as described further herein, such as changing the group type 'srd' to '2dcc'). In some embodiments, the techniques provide for a single group specification for certain applications, such as for VR media processing applications, e.g., rather than the two group definitions that can be used by existing techniques. In some embodiments, the techniques can be used to provide future extensions to support other types of coordinates, such as extensions for VR media content with 3 degrees of freedom (Dof) (3DoF), 3DoF+, Windowed 3DoF, Omnidirectional six DoF (6DoF) and 6DoF. For example, 3DoF+VR content can allow a user to move their head, and not just rotate their head, but also to move it left, right, forward, backward, etc. within specified range(s).

In some embodiments, a new 2D track relationship, such as a 2D sub-picture relationship track properties sample group, can be provided that provides a 2D-specific spatial relationship for a group of tracks (e.g., for ISOBMFF and/or OMAF). FIG. 4A shows an exemplary 2D spatial relationship description box 400, according to some embodiments. For illustrative purposes, an example can include a 2DSpatialRelationshipDescriptionBox that extends a TrackGroupTypeBox of '2dcc,' which will be used to explain the concepts herein, although other nomenclatures, structures, and/or fields can be used without departing from the spirit of the invention. The 2D spatial relationship description box can have, or be associated with, a track group type. For example, the track_group_type can indicate the grouping_type. In some embodiments, the grouping_type can be set to one or more of (a) 'msrc,' which can indicate that the track belongs to a multi-source presentation; (b) 'ster,' which can indicate that the track is either the left or right view of a stereo pair suitable for playback on a stereoscopic display; or (c) '2dcc,' which can indicate that the track belongs to a group of tracks with spatial relationships (e.g. corresponding to spatial parts of a video source) with respect to a 2D Cartesian coordinate system. In some embodiments, the grouping_type can be set to a value registered, or a value from, a derived specification or registration. The pair of track_group_id and track_group_type can identify a track group within the file. The tracks that contain a particular TrackGroupTypeBox having the same value of track_group_id and track_group_type can belong to the same track group.

As shown in FIG. 4A, a spatial relationship can be specified in 2D Cartesian coordinates using a TrackGroupTypeBox with track_group_type equal to '2dcc.' While this example uses '2dcc' to refer to spatial relationships provided using a 2D Cartesian coordinate system, this is for exemplary purposes only and is not intended to be limiting, since other naming conventions can be used other than '2dcc.' The track_group_type of '2dcc' can indicate that the track belongs to a group of tracks with spatial relationships in a 2D Cartesian coordinate system (e.g. corresponding to spatial parts of a 2D video source). The total_width 402 can specify, in pixel units, the maximum width in the coordinate system of the '2dcc' track group. The value of total_width 402 can be constrained to be the same in all instances of 2DSpatialRelationshipDescriptionBox with the same value of track_group_id.

The total_height 404 can specify, in pixel units, the maximum height in the coordinate system of the '2dcc' track group. The value of total_height 404 can be constrained to be the same in all instances of 2DSpatialRelationshipDescriptionBox with the same value of track_group_id. In some examples, total_width 402 and total_height 404 can be constrained to match an integer grid of a chroma sample array, such as to avoid ambiguity in chroma resampling (e.g. these syntax elements can be constrained to even values for the 4:2:0 chroma format).

The source_id 406 parameter can provide an identifier for the source, such as a unique identifier. The source_id 406 can specify (e.g., implicitly) a coordinate system associated to this source.

In some embodiments, the 2D spatial relationship group type can be used in combination with other fields and/or data to specify the coordinate system. For example, a TrackGroupTypeBox of track_group_type '2dcc' and a given track_group_id can specify a coordinate system with an arbitrary origin (0,0) and a maximum size defined by total_width 402 and total_height 404. The x-axis can be oriented from left to right, and the y-axis can be oriented from top to bottom. The tracks that have the same value of source_id 406 within a TrackGroupTypeBox of track_group_type '2dcc' can be mapped as being originated from the same source, and their associated coordinate systems can share the same origin (0,0) and axes orientations. For example, a very high resolution 2D video could have been split into sub-picture tracks. Each sub-picture track can convey its position and sizes in the source video. The '2dcc' track group may convey the size of the source.

In some embodiments, a source can be represented by different 2D track groups. For example, different groups can be used when the same source is available at different resolutions. Each 2D track group (e.g., '2dcc' track group) can be identified by its own identifier track_group_id. Since both '2dcc' track groups originate from the same source, they can share the same source id 406.

The techniques can be used to specify a 2D sub-picture track properties sample group. FIG. 4B shows an exemplary 2D spatial relationship group entry 450, according to some embodiments. For illustrative purposes, an example can include a 2DSpatialRelationshipGroupEntry that extends a VisualSampleGroupEntry of '2dcc,' which will be used to explain the concepts herein, although other nomenclatures, structures, and/or fields can be used without departing from the spirit of the invention. The '2dcc' grouping_type a for sample grouping can specify the positions and sizes of sub-picture tracks in a spatial relationship track group with respect to a 2D Cartesian coordinate system. While this example uses '2dcc' to specify the positions and/or sizes using a 2D Cartesian coordinate system, this is for exemplary purposes only and is not intended to be limiting, since other naming conventions can be used other than '2dcc' as noted above. In some embodiments, a specified version (e.g., Version 1) of the SampleToGroupBox can be used when the grouping_type is equal to '2dcc.' The value of the grouping_type_parameter can be constrained to be equal to the track_group_id of the corresponding spatial relationship track group.

The object_y 452 can specify the horizontal position of the top-left corner of the sub-picture track within the region specified by the corresponding spatial relationship track group prior to applying resampling. In some examples, resampling (e.g., implicit resampling) can be applied based on the track width and height, if any, being in the range of 0 to total_width−1, inclusive, where total_width is included in the corresponding 2D spatial relationship description box.

The object_y 454 can specify the vertical position of the top-left corner of the sub-picture track within the region specified by the corresponding spatial relationship track group prior to resampling. In some examples, resampling (e.g., implicit resampling) can be applied based on the track width and height, if any, being in the range of 0 to total_height−1, inclusive, where total_height is included in the corresponding 2D spatial relationship description box.

The object_width 456 can specify the width of the sub-picture track within the region specified by the corresponding spatial relationship track group prior to resampling. In some examples, resampling (e.g., implicit resampling) can be applied based on the track width and height, if any, being in the range of 1 to total_width, inclusive.

The object_height 458 can specify the height of the sub-picture track within the region specified by the corresponding spatial relationship track group prior to resampling. In some examples, resampling (e.g., implicit resampling) can be applied based on the track width and height, if any, being in the range of 1 to total_height, inclusive. In some embodiments, the object_x 452, object_y 454, object_width 456 and/or object_height 458 can be constrained to match an integer grid of chroma sample array to avoid ambiguity in chroma resampling (e.g., these syntax elements can be constrained to have even values for the 4:2:0 chroma format).

As shown in FIGS. 4A-4B, the techniques can maintain the consistency of existing specifications (e.g., discussed in conjunction with FIGS. 3A-3C) while using a different 2D-specific relationship as the base, such as the '2dcc' track group. As described further herein, the 2D-specific relationship structure(s) can be constrained in one or more ways, which can be implemented in a manner consistent with existing specifications. For example, the 2D-specific track group can be constrained such that it does not allow any gap of the tracks of a 2D-specific track group with respect to the source. Since this is a constraint for OMAF, for example, the techniques can replace the sub-picture composition track group of OMAF. As another example, if the 2D-specific track group is not constrained to not allow any overlapping among the tracks, the sub-picture composition track group of OMAF can be made a special type of a 2D-specific track group with the restriction on no overlapping (since OMAF constrains overlap). As a further example, if chroma resampling constraints are imposed on the 2D-specific track group, the group can be implemented in a manner consistent with chroma resampling constraints (e.g., such that the total height and total width of the source match an integer grid of a chroma sample array to avoid ambiguity in chroma resampling).

In some embodiments, the tracks in a '2dcc' track group can be configured to meet one or more constraints. An exemplary constraint is that any track in the '2dcc' track group shall not belong to more than one alternate group. This constraint can avoid potential confusion of selecting a track that is an alternate to the track from more than one alternate track groups. Another exemplary constraint is that if a track of an alternate group is in the '2dcc' track group, then all tracks in the alternate group shall be in the '2dcc' track group. This constraint can ensure that all alternate tracks in the alternate group are all meaningfully part of the '2dcc' group, which can be used in an alternative manner to replace their alternate tracks within the '2dcc' track group. Another exemplary constraint is that any two overlapping tracks in the '2dcc' track group have their layers defined with different values (e.g., to indicate that they are on different layers). This constraint can ensure that the overlay portion of the two tracks can be meaningfully defined. Another exemplary constraint is that the content (and/or each pixel) of the source within the rectangular area specified by total_height 404 and total_width 402 is covered by content (or a pixel) of at least one track in the '2dcc' track group. This constraint can ensure the entire area of the source is covered by the tracks in the '2dcc' track group, without any gaps or empty spots. Another exemplary constraint is that all tracks in the '2dcc' track group have a same source_id 406, total_width 402 and total_height 404 values, e.g., to indicate that they are from the same source of same size. This constraint can prevent mixture with content from other sources (e.g., with different source_ID's with different sizes).

The source can be reconstructed by picking one track from each alternate group out of all tracks belonging to the same '2dcc' track group. In some embodiments, if a track does not belong to any alternate group, the track can be a picked track. In some embodiments, for each composition-time aligned sample of each of the picked tracks, the following can be applied (e.g., in the front-to-back ordering (layer) indicated in the TrackHeaderBox of the picked tracks): for each value of i in the range of 0 to object_width−1, inclusive, and for each value of j in the range of 0 to object_height−1, inclusive, the pixel value of the source at pixel position ((i+object_x) % total_width, (j+object_y) % total_height) is set equal to the pixel value of the sub-picture of this track at pixel position (i,j).

Figure 5:
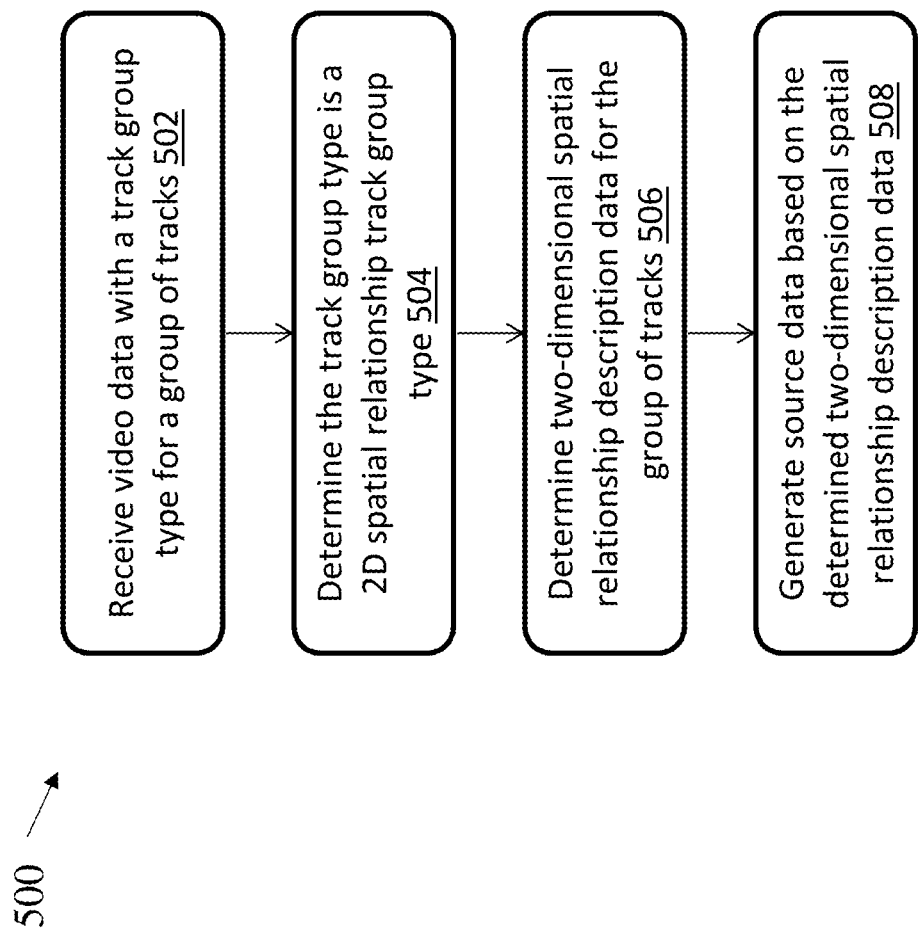
FIG. 5 is an exemplary flow chart of a computerized process for decoding video data with a 2D spatial relationship, according to some embodiments.

FIG. 5 is an exemplary flow chart of a computerized process 500 for decoding video data with a 2D spatial relationship, according to some embodiments. At step 502, the decoding device receives video data comprising a track group type for a group of two-dimensional tracks. At step 504, the decoding device determines the track group type is a two-dimensional (2D) spatial relationship track group type. At step 506, the decoding device determines two-dimensional spatial relationship description data for the group of tracks. At step 508, the decoding device generates source data (e.g., reconstructs the source) for the two-dimensional region by composing each two-dimensional track from the group of tracks based on the associated relation of the two-dimensional track to the two-dimensional region.

Referring to step 504, the 2D spatial relationship track group can be a 2D track group that specifies a spatial relationship of the group of tracks based on a two-dimensional Cartesian coordinate system. In some embodiments, each track in the group of tracks can include, or be associated with, a 2D track group. For example, the 2D track group type can be '2dcc' to indicate that the track belongs to a group of tracks with spatial relationships in a 2D Cartesian coordinate system (e.g. corresponding to spatial parts of a 2D video source).

Referring to step 506, determining the two-dimensional spatial relationship can include determining a two-dimensional region, such as a width and/or height for the region based on the two-dimensional Cartesian coordinate system. For example, the decoding device can determine a total width and/or total height based on a 2D spatial relationship description (e.g., the 2D spatial relationship description box 400 discussed in conjunction with FIG. 4A).

Referring further to step 506, determining the two-dimensional spatial relationship can include determining a relation of each two-dimensional track in the group of two-dimensional tracks to the two-dimensional region. For example, the decoding device can determine a position, a width, a height, or some combination thereof, of the two-dimensional track in the two-dimensional region. In some embodiments, the decoding device can determine the relation of each track based on a 2D spatial relationship group entry, such as the entry 450 discussed in conjunction with FIG. 4B. The decoding device can determine a horizontal position of the top-left corner of the sub-picture track, a vertical position of the top-left corner of the sub-picture track, a width of the sub-picture track, a height of the sub-picture track, or some combination thereof.

In some embodiments, the decoding device can be configured to determine the two-dimensional spatial relationship description data and/or to generate the source data based on one or more constraints as described herein. For example, a first constraint can be that each two-dimensional track in the track group is associated with only one alternate track group. As another example, a second constraint can be that any two overlapping two-dimensional tracks in the track group have a different layer value. As a further example, a third constraint can be that each pixel in the two-dimensional region comprises content. As another example, a fourth constraint can be that each two-dimensional track in the track group comprises a same source identifier and a same set of dimensions for the two-dimensional region.

The techniques can similarly be used by an encoding device to encode video data. The encoding device can encode video data with a 2D spatial relationship track group type for a group of tracks. The encoding device can encode two-dimensional spatial relationship description data for the group of tracks, including a two-dimensional region for the source and a relation of each track in the group of tracks to the two-dimensional region. The encoding device can encode the video data in accordance with one or more of the constraints discussed herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   receiving video data comprising a track group type for a group of two-dimensional tracks, wherein each two-dimensional track in the group of two-dimensional tracks comprises video data for an associated two-dimensional portion of a video source;
   determining that the track group type of a track group type metadata box of each of the two-dimensional tracks of the group of two-dimensional tracks is a two-dimensional spatial relationship track group type of a plurality of different track group types, wherein:
      the two-dimensional spatial relationship track group type specifies a spatial relationship of the two-dimensional portions of the two-dimensional tracks in the group of two-dimensional tracks based on a two-dimensional Cartesian coordinate system; and
      each of the two-dimensional tracks of the two-dimensional spatial relationship track group type meets a set of constraints comprising at least:
         a first constraint that each of the two-dimensional tracks in the group of two-dimensional tracks does not belong to more than one alternate track group; and
         a second constraint that, for each of the two-dimensional tracks in the group of two-dimensional tracks that belongs to an associated alternate track group, tracks in the associated alternate track group are in the group of two-dimensional tracks;
   processing the group of two-dimensional tracks based on the determined two-dimensional spatial relationship track group type, comprising:

determining two-dimensional spatial relationship description data for the group of two-dimensional tracks, comprising determining:
a two-dimensional region of the video source based on the two-dimensional Cartesian coordinate system; and
a spatial relation of the two-dimensional portion of the video source of each two-dimensional track in the group of two-dimensional tracks to the two-dimensional region; and
generating source data for the two-dimensional region of the video source by composing the two-dimensional portion of the video source of each two-dimensional track from the group of tracks into the two-dimensional region based on the associated spatial relation of the two-dimensional track to the two-dimensional region.

2. The method of claim 1, wherein determining the two-dimensional region of the video source comprises determining a width and a height of the two-dimensional region.

3. The method of claim 1, wherein determining the spatial relation of the two-dimensional portion of the video source of each two-dimensional track comprises determining a position, a width, a height, or some combination thereof, of the two-dimensional track in the two-dimensional region.

4. The method of claim 1, wherein the set of constraints further comprises one or more of:
a third constraint that any two overlapping two-dimensional tracks in the group of two-dimensional tracks have a different layer value;
a fourth constraint that each pixel in the two-dimensional region comprises content from at least one of the two-dimensional tracks of the group of two-dimensional tracks;
a fifth constraint that each two-dimensional track in the group of two-dimensional tracks comprises a same source identifier and a same set of dimensions for the two-dimensional region; or some combination thereof.

5. A method for encoding video data, the method comprising:
encoding video data comprising a track group type for a group of two-dimensional tracks, wherein each two-dimensional track in the group of two-dimensional tracks comprises video data for an associated two-dimensional portion of a video source, wherein:
the track group type of a track group type metadata box of each of the two-dimensional tracks of the group of two-dimensional tracks is a two-dimensional spatial relationship track group type of a plurality of different track group types, wherein:
the two-dimensional spatial relationship track group type specifies a spatial relationship of the two-dimensional portions of the two-dimensional tracks in the group of two-dimensional tracks based on a two-dimensional Cartesian coordinate system; and
each of the two-dimensional tracks of the two-dimensional spatial relationship track group type meets a set of constraints comprising at least:
a first constraint that each of the two-dimensional tracks in the group of two-dimensional tracks does not belong to more than one alternate track group; and
a second constraint that, for each of the two-dimensional tracks in the group of two-dimensional tracks that belongs to an associated alternate track group, tracks in the associated alternate track group are in the group of two-dimensional tracks; and
two-dimensional spatial relationship description data for the group of two: dimensional tracks is specified, comprising:
a two-dimensional region of the video source based on the two-dimensional Cartesian coordinate system; and
a spatial relation of the two-dimensional portion of the video source of each two-dimensional track in the group of two-dimensional tracks to the two-dimensional region;
such that source data can be generated for the two-dimensional region of the video source by composing the two-dimensional portion of the video source of each two-dimensional track from the group of tracks into the two-dimensional region based on the associated spatial relation of the two-dimensional track to the two-dimensional region.

6. The method of claim 5, wherein the two-dimensional region of the video source comprises a width and a height of the two-dimensional region.

7. The method of claim 5, wherein the spatial relation of the two-dimensional portion of the video source of each two-dimensional track comprises a position, a width, a height, or some combination thereof, of the two-dimensional track in the two-dimensional region.

8. The method of claim 5, wherein the set of constraints further comprises one or more of:
a third constraint that any two overlapping two-dimensional tracks in the group of two-dimensional tracks have a different layer value;
a fourth constraint that each pixel in the two-dimensional region comprises content from at least one of the two-dimensional tracks of the group of two-dimensional tracks;
a fifth constraint that each two-dimensional track in the group of two-dimensional tracks comprises a same source identifier and a same set of dimensions for the two-dimensional region; or some combination thereof.

9. An apparatus configured to decode video data, the apparatus comprising a processor in communication with memory, the processor being configured to execute instructions stored in the memory that cause the processor to:
receive video data comprising a track group type for a group of two-dimensional tracks, wherein each two-dimensional track in the group of two-dimensional tracks comprises video data for an associated two-dimensional portion of a video source;
determine that the track group type of a track group type metadata box of each of the two-dimensional tracks of the group of two-dimensional tracks is a two-dimensional spatial relationship track group type of a plurality of different track group types, wherein:
the two-dimensional spatial relationship track group type specifies a spatial relationship of the two-dimensional portions of the two-dimensional tracks in the group of two-dimensional tracks based on a two-dimensional Cartesian coordinate system; and
each of the two-dimensional tracks of the two-dimensional spatial relationship track group type meets a set of constraints comprising at least:
a first constraint that each of the two-dimensional tracks in the group of two-dimensional tracks does not belong to more than one alternate track group; and a second constraint that, for each of the two-dimensional tracks in the group of two-dimensional tracks that belongs to an associated alternate track group, tracks in the associated alternate track group are in the group of two-dimensional tracks;

process the group of two-dimensional tracks based on the determined two-dimensional spatial relationship track group type, comprising:

determining two-dimensional spatial relationship description data for the group of two-dimensional tracks, comprising determining:

a two-dimensional region of the video source based on the two-dimensional Cartesian coordinate system; and a spatial relation of the two-dimensional portion of the video source of each two-dimensional track in the group of two-dimensional tracks to the two-dimensional region; and generate source data for the two-dimensional region of the video source by composing the two-dimensional portion of the video source of each two-dimensional track from the group of tracks into the two-dimensional region based on the associated spatial relation of the two-dimensional track to the two-dimensional region.

10. The apparatus of claim 9, wherein determining the two-dimensional region of the video source comprises determining a width and a height of the two-dimensional region.

11. The apparatus of claim 9, wherein determining the spatial relation of the two-dimensional portion of the video source of each two-dimensional track comprises determining a position, a width, a height, or some combination thereof, of the two-dimensional track in the two-dimensional region.

12. The apparatus of claim 9, wherein the set of constraints further comprises one or more of:

a third constraint that any two overlapping two-dimensional tracks in the group of two-dimensional tracks have a different layer value;

a fourth constraint that each pixel in the two-dimensional region comprises content from at least one of the two-dimensional tracks of the group of two-dimensional tracks;

a fifth constraint that each two-dimensional track in the group of two-dimensional tracks comprises a same source identifier and a same set of dimensions for the two-dimensional region; or some combination thereof.

13. An apparatus for encoding video data, the apparatus comprising a processor in communication with memory, the processor being configured to execute instructions stored in the memory that cause the processor to:

encode video data comprising a track group type for a group of two-dimensional tracks, wherein each two-dimensional track in the group of two-dimensional tracks comprises video data for an associated two-dimensional portion of a video source, wherein:

the track group type of a track group type metadata box of each of the two-dimensional tracks of the group of two-dimensional tracks is a two-dimensional spatial relationship track group type of a plurality of different track group types, wherein:

the two-dimensional spatial relationship track group type specifies a spatial relationship of the two-dimensional portions of the two-dimensional tracks in the group of two-dimensional tracks based on a two-dimensional Cartesian coordinate system; and each of the two-dimensional tracks of the two-dimensional spatial relationship track group type meets a set of constraints comprising at least:

a first constraint that each of the two-dimensional tracks in the group of two-dimensional tracks does not belong to more than one alternate track group; and a second constraint that, for each of the two-dimensional tracks in the group of two-dimensional tracks that belongs to an associated alternate track group, tracks in the associated alternate track group are in the group of two-dimensional tracks; and two-dimensional spatial relationship description data for the group of two-dimensional tracks is specified, comprising:

a two-dimensional region of the video source based on the two-dimensional Cartesian coordinate system; and a spatial relation of the two-dimensional portion of the video source of each two-dimensional track in the group of two-dimensional tracks to the two-dimensional region;

such that source data can be generated for the two-dimensional region of the video source by composing the two-dimensional portion of the video source of each two-dimensional track from the group of tracks into the two-dimensional region based on the associated spatial relation of the two-dimensional track to the two-dimensional region.

14. The apparatus of claim 13, wherein the two-dimensional region of the video source comprises a width and a height of the two-dimensional region.

15. The apparatus of claim 13, wherein the spatial relation of the two-dimensional portion of the video source of each two-dimensional track comprises a position, a width, a height, or some combination thereof, of the two-dimensional track in the two-dimensional region.

16. The apparatus of claim 13, wherein the set of constraints further comprises one or more of:

a third constraint that any two overlapping two-dimensional tracks in the group of two-dimensional tracks have a different layer value;

a fourth constraint that each pixel in the two-dimensional region comprises content from at least one of the two-dimensional tracks of the group of two-dimensional tracks;

a fifth constraint that each two-dimensional track in the group of two-dimensional tracks comprises a same source identifier and a same set of dimensions for the two-dimensional region; or some combination thereof.

17. The method of claim 1, wherein:

receiving the video data comprises receiving:

a first alternate group of tracks comprising the group of two-dimensional tracks, wherein each track of the group of two-dimensional tracks comprises a first resolution; and a second alternate group of tracks comprising a second set group of two-dimensional tracks, wherein the second alternate group of tracks is different than the first alternate group of tracks, and each track of the second group of two-dimensional tracks comprises a second resolution different than the first resolution; and processing the two-dimensional tracks comprises:
  determining each track of the group of two-dimensional track belongs to the first alternate group of tracks; and
  selecting the first alternate group of tracks to process.

18. The method of claim 1, wherein the plurality of the different track group types comprise the two-dimensional spatial relationship track group type, a 3 degrees of freedom (3DoF) track group type, and a 6 degrees of freedom (6DoF) track group type.

19. The method of claim 1, wherein the plurality of the different track group types comprise the two-dimensional spatial relationship track group type, a multi-source presentation track group type, and a left or right view of a stereo pair track group type.

* * * * *